United States Patent
Dalal et al.

(10) Patent No.: US 9,442,702 B1
(45) Date of Patent: Sep. 13, 2016

(54) OVERRIDING AN INTERFACE IN A GRAPHICAL BLOCK DIAGRAM MODELING ENVIRONMENT

(71) Applicant: The MathWorks, Inc., Natick, MA (US)

(72) Inventors: Yogesh Dalal, Bangalore (IN); John E. Ciolfi, Wellesley, MA (US); Sanjai Singh, Bangalore (IN)

(73) Assignee: The MathWorks, Inc., Natick, MA (US)

( * ) Notice: Subject to any disclaimer, the term of this patent is extended or adjusted under 35 U.S.C. 154(b) by 95 days.

(21) Appl. No.: 13/835,918

(22) Filed: Mar. 15, 2013

Related U.S. Application Data

(63) Continuation-in-part of application No. 13/459,281, filed on Apr. 30, 2012, now Pat. No. 9,058,175.

(60) Provisional application No. 61/730,274, filed on Nov. 27, 2012.

(51) Int. Cl.
  *G06F 9/44* (2006.01)

(52) U.S. Cl.
  CPC .................................... *G06F 8/34* (2013.01)

(58) Field of Classification Search
  None
  See application file for complete search history.

(56) References Cited

U.S. PATENT DOCUMENTS

| | | | |
|---|---|---|---|
| 5,801,942 A | 9/1998 | Nixon et al. | |
| 7,344,883 B2 | 3/2008 | Vogels et al. | |
| 7,546,602 B2 | 6/2009 | Hejlsberg et al. | |
| 7,934,194 B2 | 4/2011 | Kinnucan, Jr. et al. | |
| 2003/0016246 A1* | 1/2003 | Singh | 345/763 |
| 2003/0060913 A1 | 3/2003 | Turner et al. | |
| 2006/0009942 A1 | 1/2006 | Keck et al. | |
| 2006/0009943 A1 | 1/2006 | Keck et al. | |
| 2006/0010416 A1 | 1/2006 | Keck et al. | |
| 2006/0053374 A1 | 3/2006 | Wilensky | |
| 2008/0033710 A1 | 2/2008 | Turner et al. | |
| 2008/0092111 A1* | 4/2008 | Kinnucan et al. | 717/105 |
| 2008/0177994 A1 | 7/2008 | Mayer | |
| 2012/0316851 A1 | 12/2012 | Dalal et al. | |

OTHER PUBLICATIONS

Kinnucan et al., "A Graphical Approach to Object-Oriented Modeling of Dynamic Systems", Summer Computer Simulation Conference, 2007, pp. 513-521.

\* cited by examiner

*Primary Examiner* — Li B Zhen
*Assistant Examiner* — Amir Soltanzadeh
(74) *Attorney, Agent, or Firm* — Harrity & Harrity, LLP

(57) ABSTRACT

A device receives information that identifies a parameter associated with a masked block that represents elements of a block diagram model that, when executed, simulates a behavior of a system. The masked block is associated with a first user interface that allows a value of the parameter to be specified for the masked block. The device receives an indication that the parameter is to be associated with a derived block that represents the elements of the block diagram model. The derived block inherits one or more properties from the masked block. The device creates the derived block, and associates the derived block with the parameter and a second user interface that allows a value of the parameter to be specified for the derived block. The device outputs or stores information that identifies the parameter, the derived block, and the association between the parameter and the derived block.

20 Claims, 17 Drawing Sheets

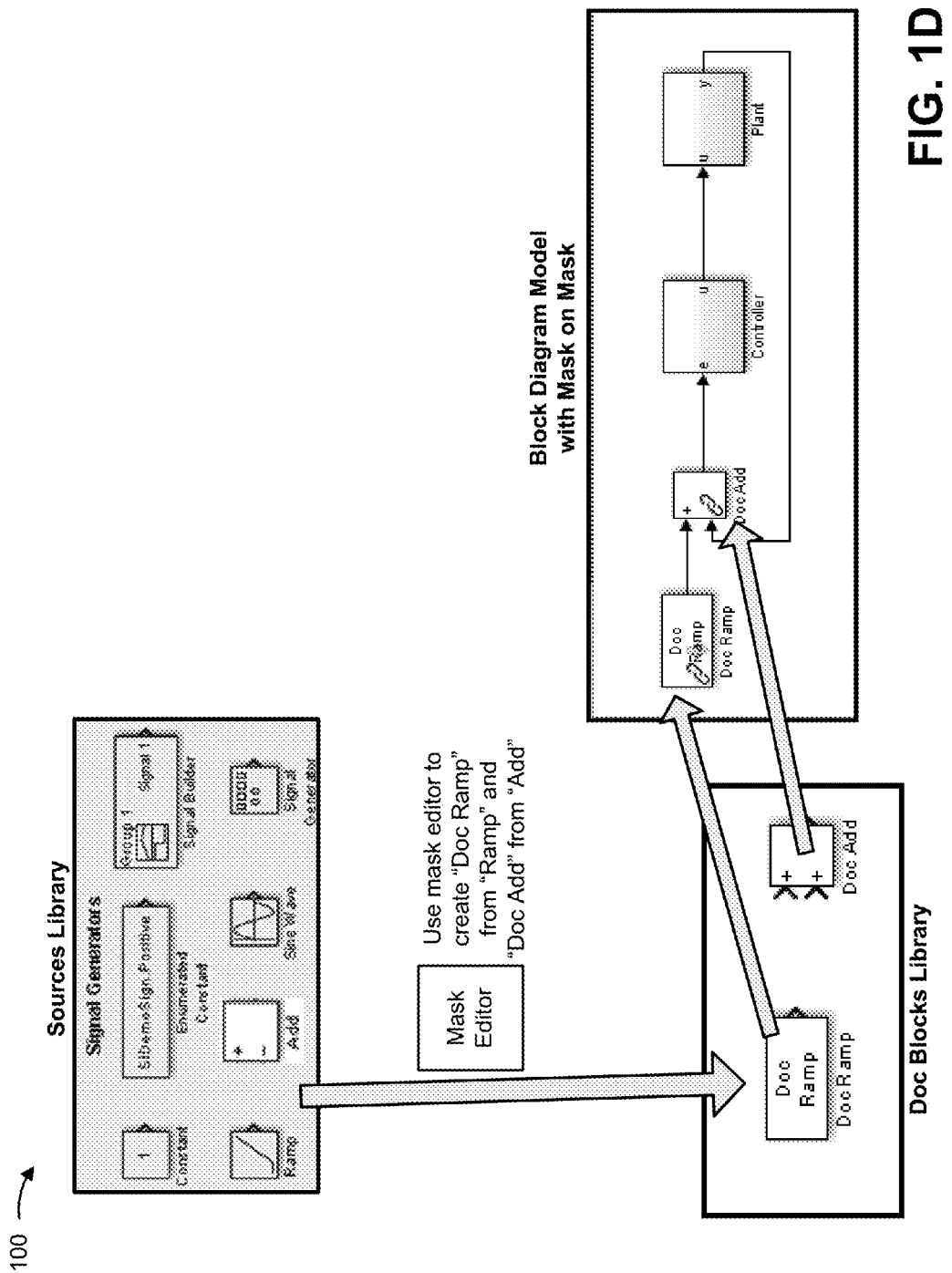

OVERRIDING AN INTERFACE IN A GRAPHICAL BLOCK DIAGRAM MODELING ENVIRONMENT

RELATED APPLICATION

This application claims priority under 35 U.S.C. §119 based on U.S. Provisional Patent Application No. 61/730,274, filed on Nov. 27, 2012, the content of which is incorporated by reference herein in its entirety. This application is also a continuation-in-part of U.S. patent application Ser. No. 13/459,281, filed on Apr. 30, 2012, the content of which is incorporated by reference herein in its entirety.

BRIEF DESCRIPTION OF THE DRAWINGS

FIGS. 1A-1D are diagrams of an overview of an example implementation described herein;

DETAILED DESCRIPTION

The following detailed description of example implementations refers to the accompanying drawings. The same reference numbers in different drawings may identify the same or similar elements.

Block diagram models, consisting of one or more blocks, may be utilized in a variety of modeling paradigms and application contexts in engineering and science. A block may include elements (e.g., sub-blocks) from which a model can be built, and may be defined by block parameters that describe the behavior of the block in the context of the model (e.g., execution behavior in time and space). In some modeling paradigms, multiple elements (e.g., blocks, sub-blocks, underlying elements or components, etc.) may be combined into a combined block, and the combined block may be provided to a user to build complex system models. A designer of a combined block may simplify the complexity of the combined block by providing a simple user interface, which may be referred to as a mask, for a user to specify values for block parameters.

A mask, as used herein, may refer to a custom user interface for a block. For example, a mask may replace an icon and/or a dialog box associated with a block with a different icon and/or dialog box associated with the block, based on user needs. A block that has been masked (e.g., a block for which a custom user interface has been created) may be referred to as a masked block. A designer may specify parameters of the masked block that may be edited via the custom user interface. For example, a masked block may include many underlying elements, a small number of which may be of interest to a user. A masked block may be customized so that only parameters associated with elements of interest to the user may be edited (e.g., via the custom user interface). The masked block may be associated with a logical workspace local to the subsystem (or sub-hierarchy) associated with the masked block, where the elements in the subsystem (or sub-hierarchy) have access to named variable in the logical workspace.

When a block is masked, a user may have difficulty further customizing the masked block based on the user's needs. For example, two different users may want to edit different parameters associated with different underlying elements of the masked block. To accomplish this, the users may be required to create separate blocks that combine the elements of interest to each user. Alternatively, a user may wrap a block inside of a subsystem, and may mask the subsystem. Customizing blocks in this manner may result in added complexity, a large library of masked blocks, a large memory footprint, high run-time costs, and a loosely integrated modeling paradigm. Implementations described herein simplify block diagram modeling by allowing a user to create a custom mask on top of an existing base mask. The custom mask may inherit parameters and/or other block properties from the base mask, which may result in a highly integrated modeling environment.

Figure 1A:
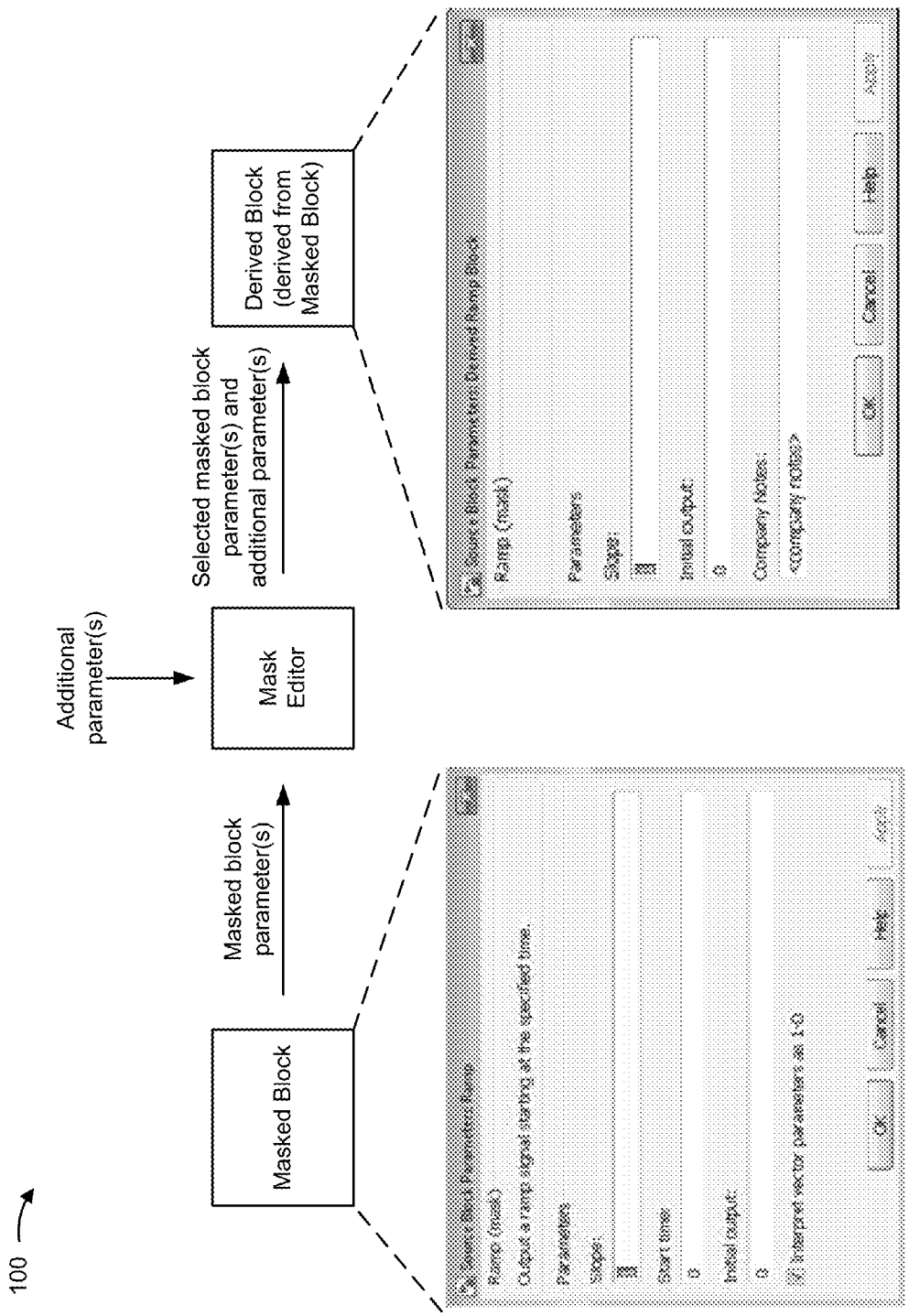

FIGS. 1A-1D are diagrams of an overview of an example implementation 100 described herein. As shown in FIG. 1A, a masked block may be associated with a custom user interface that allows a user to edit particular parameters associated with the masked block. As shown, the custom user interface may allow the user to specify the following parameters: slope, start time, initial output, and whether or not to interpret vector parameters as one dimensional. A user may interact with a mask editor to select masked block parameters, associated with the masked block, to be included in a derived block that is derived from the masked block. The user may also input additional parameters via the mask editor.

The mask editor may create a mask for the derived block based on the selected masked block parameters and the additional parameters. For example, the user may select, from the masked block, the masked block parameters of slope and initial output, may decline to select the masked block parameters of initial output and whether or not to interpret vector parameters as one dimensional, and may input an additional parameter of company notes. The mask editor may create a custom user interface for the derived block that allows the user to edit the parameters of slope, initial output, and company notes, as shown.

Figure 1B:
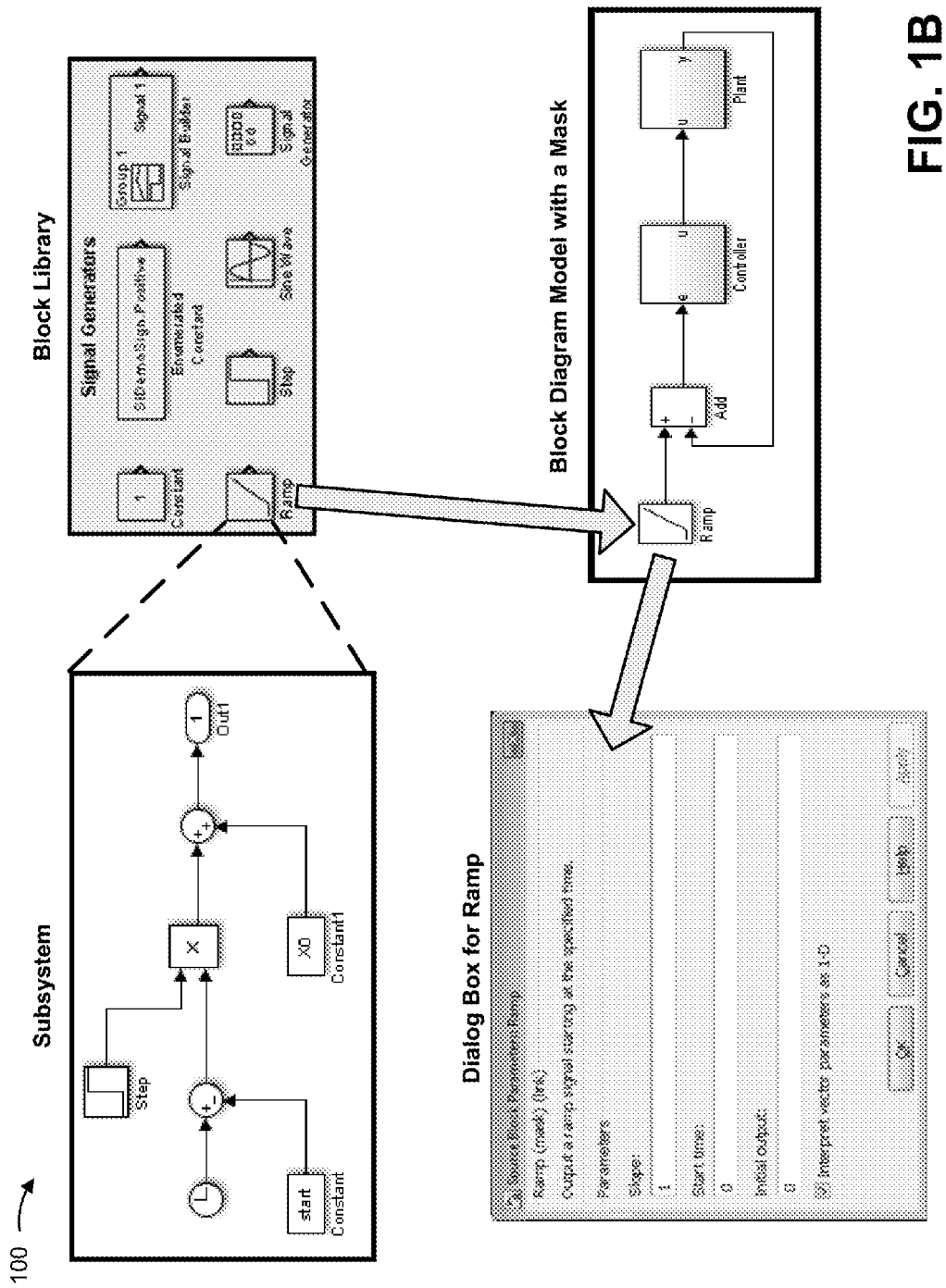

As shown in FIG. 1B, a custom subsystem block (e.g., a masked block) may include multiple underlying blocks, and the masked block may be included in a block library. For example, a "Ramp" block may include a number of underlying blocks, as shown. The mask may provide a workspace for parameters used by the masked block, and may provide a dialog box that allows a user to input parameters used by the underlying subsystem blocks in the workspace associated with the mask (e/g. the Ramp block). For example, a user may add the Ramp block to a block diagram model, and may edit parameters associated with the Ramp block, such as slope, start time, and initial output. The input parameters may affect a behavior of the underlying blocks included in the Ramp block. However, a user may not be permitted to create a new custom block (e.g., a new mask on the existing mask) from an existing custom block (e.g., the existing mask).

Figure 1C:
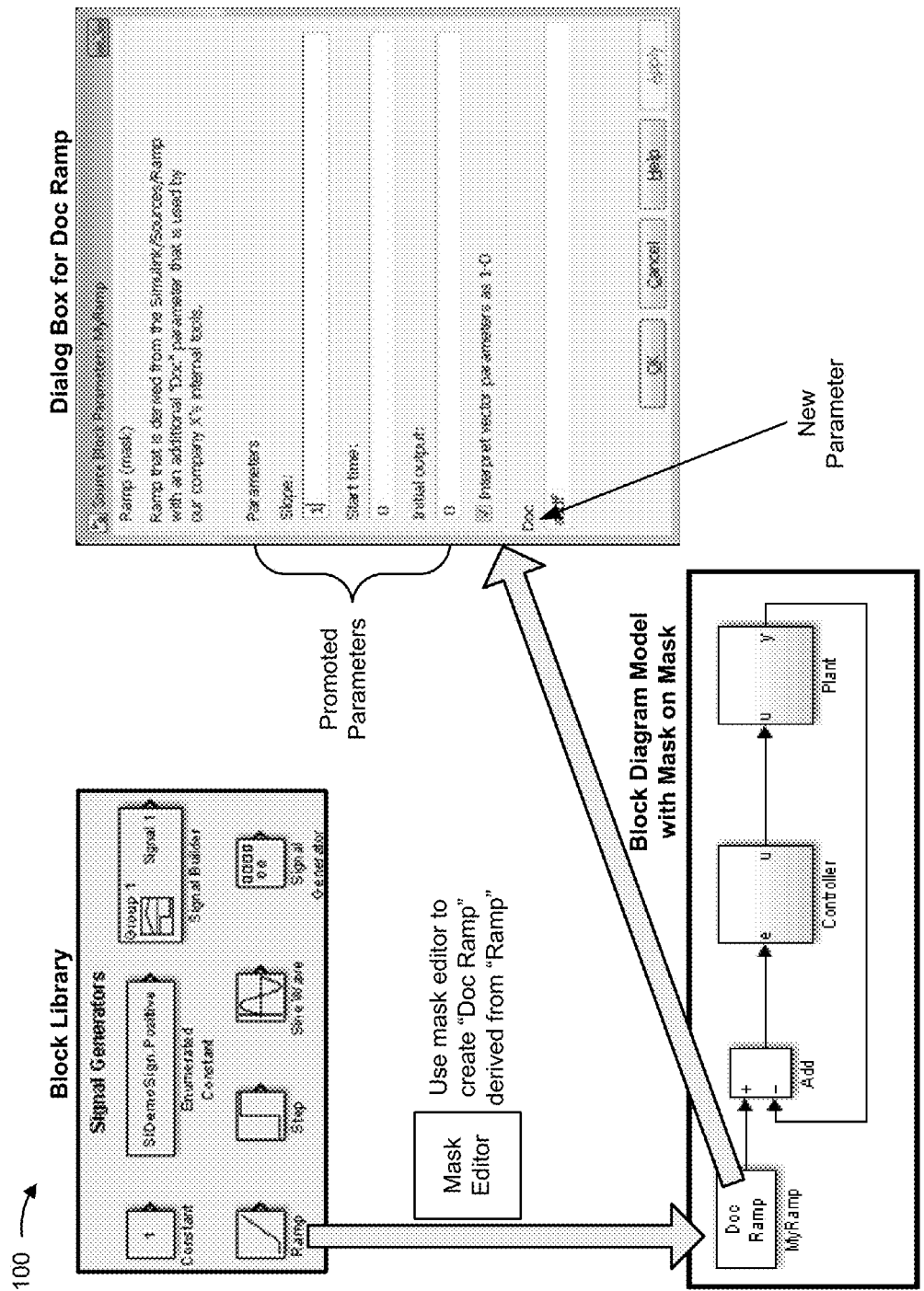

As shown in FIG. 1C, the mask editor may permit the user to create a new mask on the existing mask. For example, the user may use the mask editors to edit the Ramp block, from the block library, to create a new "Doc Ramp" block. The user may copy the Ramp block into a block diagram model, and may edit the Ramp block using the mask editor. For example, the user may rename the block "Doc Ramp" or "My Ramp," may promote parameters from the underlying Ramp block (e.g., slope, start time, and initial output), and may add additional parameters, such as a "Doc" parameter, as shown in the dialog box for Doc Ramp.

As shown in FIG. 1D, the user may mask the Ramp block, from a Sources Library, to create a new custom Doc Ramp, and may store the new Doc Ramp mask in a block library named "Doc Blocks Library." The Doc Blocks Library may be linked back to the Sources Library. The Doc Ramp block may be reused in other models. Additionally, the user may create other masks from existing masks, such as by using the mask editor to create a "Doc Add" block from an "Add" block, and may place these blocks within the Doc Blocks Library, as shown. The user may add the new mask blocks (Doc Ramp and Doc Add) to a block diagram model by, for example, dragging the blocks from the Doc Blocks Library and dropping them into a model. In this way, changes to the Ramp block (e.g., changes to parameters, changes to the underlying system, etc.) in the Sources Library may be automatically inherited by the Doc Ramp block in the Doc Blocks Library, due to the linkage between the blocks and/or the libraries. The newly-created masked blocks may provide the user with additional functionality, such as generating a report that uses the Doc parameter to aid in the presentation of model execution results. In this way, the mask editor allows a user to customize existing masks in a block diagram modeling environment.

Figure 2:
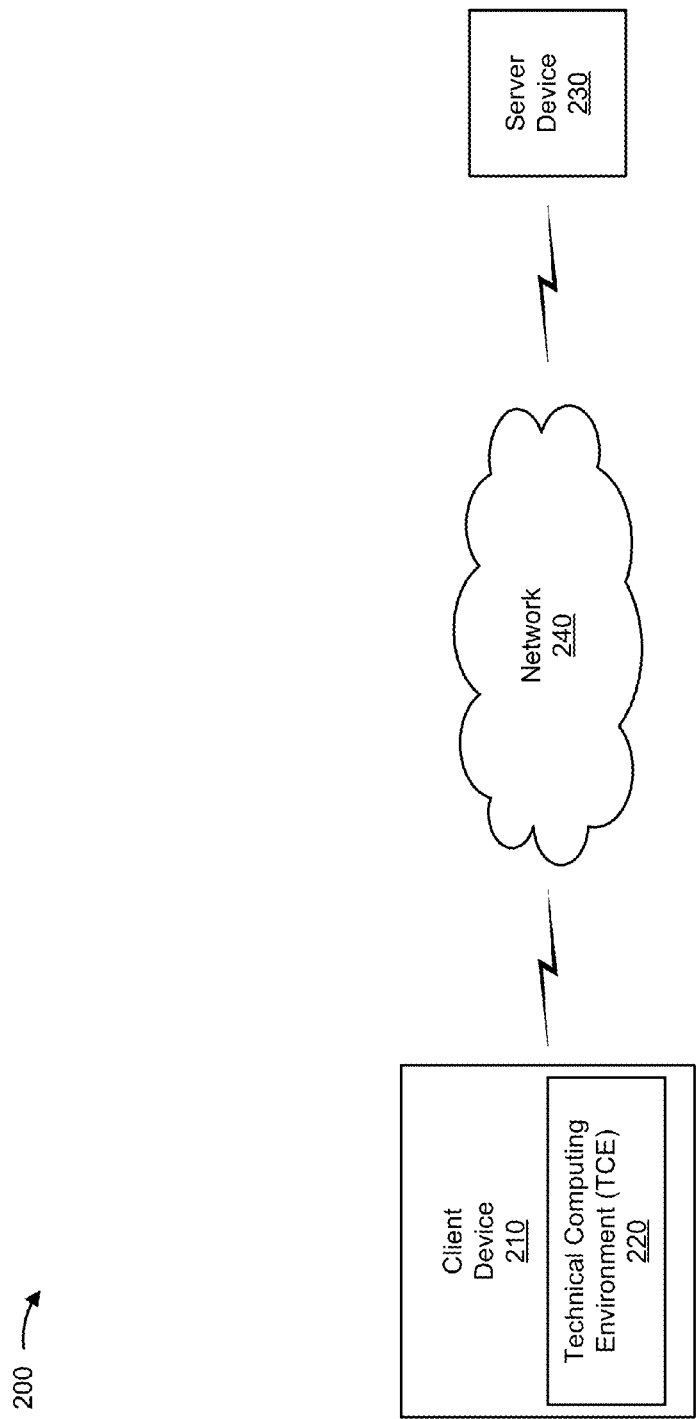
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230 and a network 240. Devices of environment 200 may interconnect via wired connections, wireless connections, or a combination of wired and wireless connections.

Client device 210 may include a device capable of creating and/or editing a block diagram model. For example, client device 210 may include a computing device (e.g., a desktop computer, a laptop computer, a tablet computer, a handheld computer, a server, etc.), a mobile phone (e.g., a smart phone, a radiotelephone, etc.), or a similar device. In some implementations, client device 210 may receive information from and/or transmit information to server device 230 (e.g., information associated with a block diagram model).

Client device 210 may host TCE 220. TCE 220 may include any hardware-based logic or a combination of hardware and software-based logic that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; etc.), or another type of environment, such as a hybrid environment that may include, for example, a text-based environment and a graphically-based environment. In some implementations, TCE 220 may include a modeling application used to generate, process, and/or execute a model (e.g., a textual model and/or a graphical model, such as a block diagram model), such as a model of a physical system.

TCE 220 may include a modeling system that may be used in the creation of a functional model and that may enable generation of executable code based on the model. For example, TCE 220 may include a graphical modeling tool or application that provides a user interface for a numerical computing environment. Additionally, or alternatively, TCE 220 may include a graphical modeling tool and/or application that provides a user interface for modeling and simulating (e.g., by executing a model) a dynamic system (e.g., based on differential equations, difference equations, algebraic equations, discrete events, discrete states, stochastic relations, etc.). A dynamic system (either natural or man-made) may be a system whose response at any given time may be a function of its input stimuli, its current state, and a current time.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice. A block may be hierarchical in that the block itself may comprise one or more blocks that make up the block.

A graphical model (e.g., a functional model) may include entities with relationships between the entities, and the relationships and/or the entities may have attributes associated with them. The graphical entities may represent time-based dynamic systems, such as differential equation systems. In some embodiments, the graphical model and the graphical entities may represent a multi-domain dynamic system. The domains may include execution domains such as, for example, continuous time, discrete time, discrete event, state transition system, and/or a model of computation. The model of computation may be based on differential equations, difference equations, algebraic equations, discrete events, discrete states, stochastic relations, data flows, synchronous data flows, control flows, process networks, and/or state machines.

The entities my include model elements, such as blocks and/or ports. The relationships may include model elements, such as lines (e.g., connector lines) and references. The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

Server device 230 may include one or more devices capable of receiving, storing, processing, and/or transmitting information, such as information associated with a block diagram model. For example, server device 230 may include a computing device, such as a server, a desktop computer, a laptop computer, a tablet computer, a handheld computer, or a similar device.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
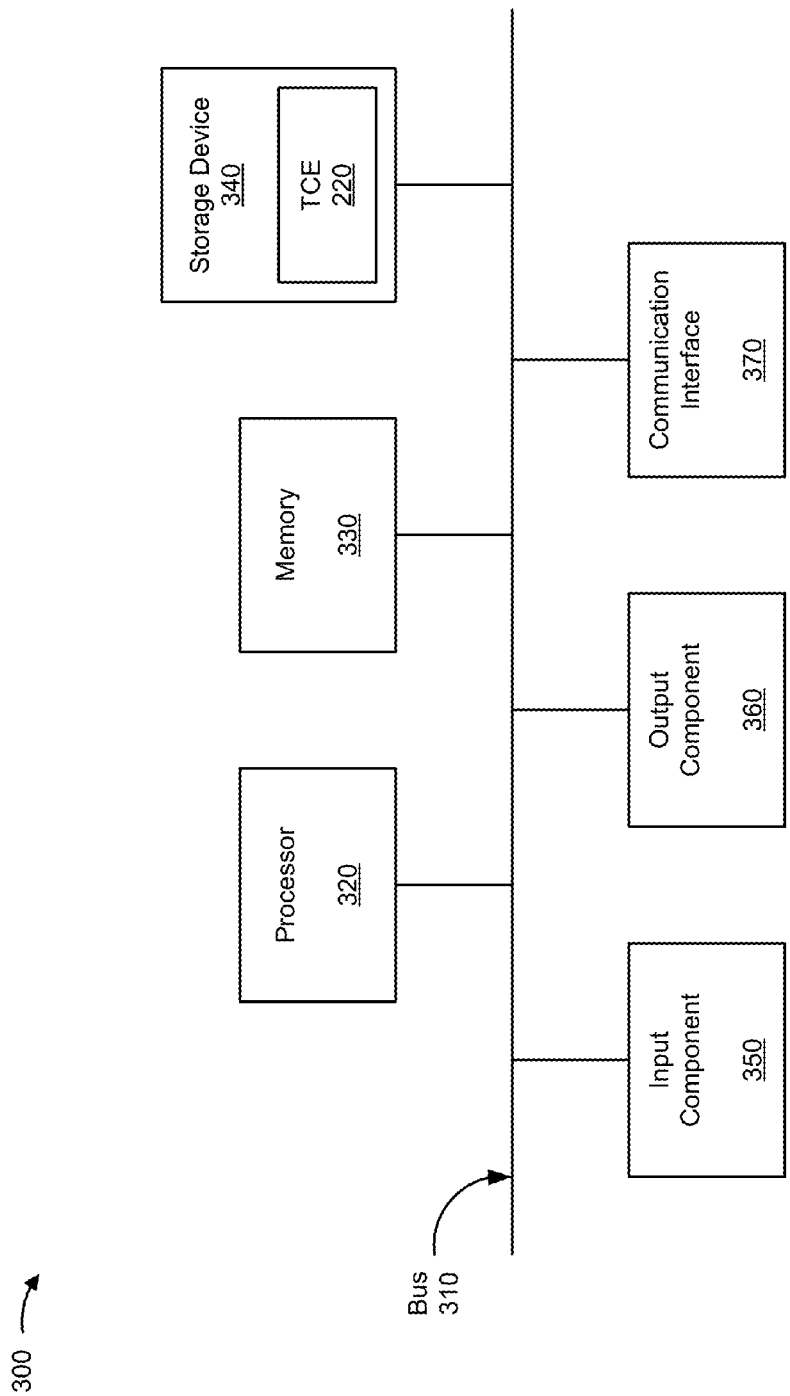
FIG. 3 is a diagram of example components of one or more devices of FIG. 2.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage device 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Storage device 340 may store information and/or software related to the operation and use of device 300. For example, storage device 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage device 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage device 340. A computer-readable medium may be defined as a non-transitory memory device. A memory device may include memory space within a single physical storage device or memory space spread across multiple physical storage devices.

Software instructions may be read into memory 330 and/or storage device 340 from another computer-readable medium or from another device via communication interface 370. When executed, software instructions stored in memory 330 and/or storage device 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
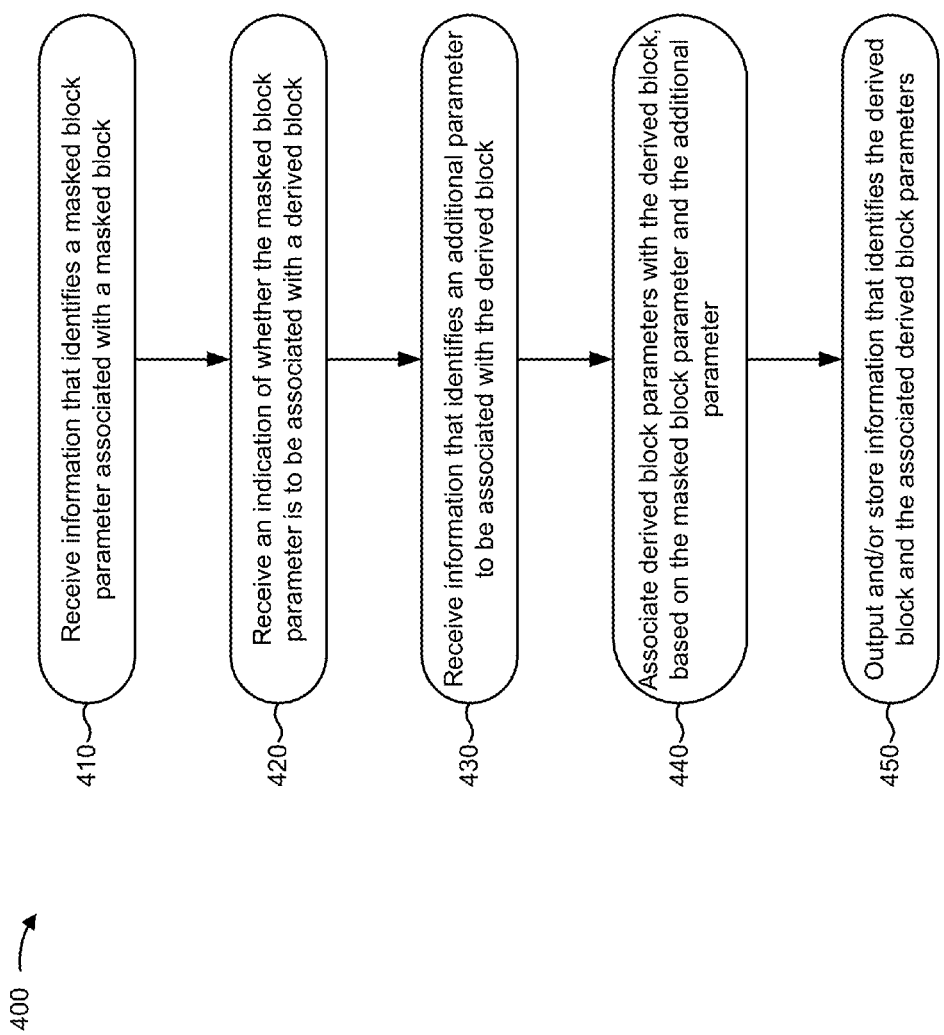
FIG. 4 is a flow chart of an example process for customizing a masked block in a block diagram model.

FIG. 4 is a flow chart of an example process 400 for customizing a masked block in a block diagram model. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving information that identifies a masked block parameter associated with a masked block (block 410). A masked block may refer to, for example, a block (e.g. an element of a block diagram model) for which a custom user interface has been created. The custom user interface may allow a user to specify a value for a parameter associated with the masked block, which may be referred to herein as a masked block parameter. Client device 210 may receive information that identifies a masked block parameter associated with the masked block. For example, client device 210 may retrieve the information from memory (e.g., memory 330). Additionally, or alternatively, client device 210 may receive the information from server device 230.

A parameter (such as a masked block parameter, an additional parameter, a derived block parameter, etc.) may describe the behavior of a block in the context of the block diagram model, and may influence a manner in which the block behaves, when executed. For example, the parameter may identify an input to the block (and/or a system represented by the block), an output from the block, a manner in which the input is processed by the block, a manner in which the output is generated by the block, a state associated with the block, and/or other information that describes a behavior of the block. A user may interact with the custom user interface to specify a value of a parameter (e.g., a numerical value, a string value, a Boolean value, an array of values, etc.). For example, client device 210 may permit the user to specify a value for the masked block parameter via a user interface associated with the masked block.

As further shown in FIG. 4, process 400 may include receiving an indication of whether the masked block parameter is to be associated with a derived block (block 420). For example, client device 210 may receive (e.g., from a user) an indication that the masked block parameter is to be associated with a derived block, or may receive an indication that the masked block parameter is not to be associated with the derived block. A derived block may refer to a block, in a block diagram model, that includes elements included in the masked block, but that is associated with a different custom user interface than the masked block. The custom user interface associated with the derived block may or may not allow a user to edit (e.g., specify a value of) a masked block parameter, depending on whether client device 210 receives an indication that the masked block parameter is to be associated with the derived block or is not to be associated with the derived block.

For example, if client device 210 receives an indication that the masked block parameter is to be associated with the derived block, then the derived block may inherit the masked block parameter from the masked block, and a user may be permitted to specify a value for the masked block parameter via a user interface associated with the derived block. Conversely, if client device 210 receives an indication that the masked block parameter is not to be associated with the derived block, then the derived block may not inherit the masked block parameter from the masked block, and the user may not be permitted to specify a value for the masked block parameter via a user interface associated with the derived block. Client device 210 may identify an inherited parameter using the same name as the name of the masked block parameter. Conversely, client device 210 may identify non-inherited parameters using unique names.

In some implementations, the derived block may inherit a block property from the masked block. For example, the derived block may inherit initialization code from the masked block. Initialization code may specify an initial value for a parameter. Additionally, or alternatively, the derived block may inherit an icon from the masked block. For example, an icon that represents the masked block may be used and/or edited in a particular manner to create an icon that represents the derived block. Additionally, or alternatively, the derived block may inherit a function from the masked block. For example, the derived block may use the same function as the masked block to process an input and/or generate an output.

In some implementations, client device 210 may identify a block type associated with the masked block. The block type may, for example, be identified using a class identifier, and may describe characteristics of the masked block, such as parameters and/or properties of the masked block, described elsewhere herein. When creating the derived block, user device 210 may create the derived block as a same block type as the masked block. Additionally, or alternatively, user device 210 may designate a different class identifier for the derived block. In this way, a user may create a hierarchy of blocks.

For example, a first derived block of type "MyFirstRamp" may be derived from a base block of type "Ramp." Additionally, a second derived block of type "MySecondRamp" may be derived from the base block of type "Ramp." The first and second derived blocks may be of type Ramp (and of sub-types MyFirstRamp and MySecondRamp, respectively), and may share some characteristics of the Ramp type. However, MySecondRamp may not be of type MyFirstRamp, and MyFirstRamp may not be of type MySecondRamp. In this way, a user may create multiple derived blocks that share characteristics with a single base block.

As shown in FIG. 4, process 400 may include receiving information that identifies an additional parameter to be associated with the derived block (block 430). For example, client device 210 may receive, from a user, information that identifies an additional parameter to be associated with the derived block. The additional parameter may be different from the masked block parameter. For example, the user may not be permitted to specify a value for the additional parameter via a user interface associated with the masked block. In some implementations, client device 210 may provide a user interface for the user to input the additional parameter. Additionally, or alternatively, the additional parameter may be received from server device 230.

As further shown in FIG. 4, process 400 may include associating derived block parameters with the derived block, based on the masked block parameter and the additional parameter (block 440). For example, client device 210 may determine derived block parameters based on the masked block parameter and the additional parameter, and may associate the determined derived block parameters with the derived block. A user may indicate that one or more masked block parameters are to be associated with the derived block (e.g., the mask of the derived block), and the derived block may inherit the masked block parameters from the masked block (e.g., the masked block parameters may become derived block parameters). Additionally, a user may identify an additional parameter to be associated with the derived block, and the additional parameter may be added to the derived block (e.g., the additional parameter may become a derived block parameter). A derived block parameter may refer to a parameter associated with a derived block. For example, a user may be permitted to specify a value for the derived block parameter via a user interface associated with the derived block.

The derived block parameter may include a masked block parameter inherited from the masked block when client device 210 receives an indication that the masked block parameter is to be associated with the derived block. Additionally, or alternatively, the derived block parameter may include an additional parameter (e.g., a parameter input to client device 210 by a user).

As further shown in FIG. 4, process 400 may include outputting and/or storing information that identifies the derived block and the associated derived block parameters (block 450). For example, client device 210 may output (e.g., via a user interface) information that identifies the derived block, such as an icon that represents the derived block, and information that identifies the derived block parameters, such as via a user interface (e.g., a dialog box) that allows a user to specify values for the derived block parameters. Additionally, or alternatively, client device 210 may store (e.g., in memory) the information that identifies the derived block, the derived block parameters, and the association between the derived block and the derived block parameters. In some implementations, client device 210 may store the information in a reusable library for use in a block diagram model. Additionally, or alternatively, client device 210 may transmit the information to server device 230 for storage in a block library and/or for reuse by other devices.

Additionally, or alternatively, client device 210 may output and/or store an association between the masked block and the derived block. In some implementations, client device 210 may output and/or store information that identifies a hierarchy of blocks. The hierarchy of blocks may include base blocks with particular functions, masked blocks that include a custom user interface built on one or more base blocks, and/or derived blocks derived from the masked blocks.

In this hierarchy, client device 210 may identify a base block, may identify a masked block as being derived from the base block, and may identify the derived block as being derived from the masked block (and of the base block). Additional derived blocks may be derived from the masked blocks and/or the derived blocks, and may be identified as being derived from the masked blocks and/or derived blocks from which the additional derived blocks are derived. This hierarchy may simplify a block library by associating related blocks.

The blocks stored in the block library (e.g., derived blocks, masked blocks, base blocks, etc.) may be used to create a block diagram model that, when executed, simulates a behavior of a system. When creating the block diagram model, a user may input parameters, associated with a block, using the custom user interface (e.g., the mask) created using process 400.

While a series of blocks has been described with regard to FIG. 4, the blocks and/or the order of the blocks may be modified in some implementations. Additionally, or alternatively, non-dependent blocks may be performed in parallel.

FIGS. 5A-5J are diagrams of an example implementation relating to example process 400 (FIG. 4). FIGS. 5A-5J depict various user interfaces that may assist a user in customizing a masked block by creating a derived block from the masked block.

Figure 5A:
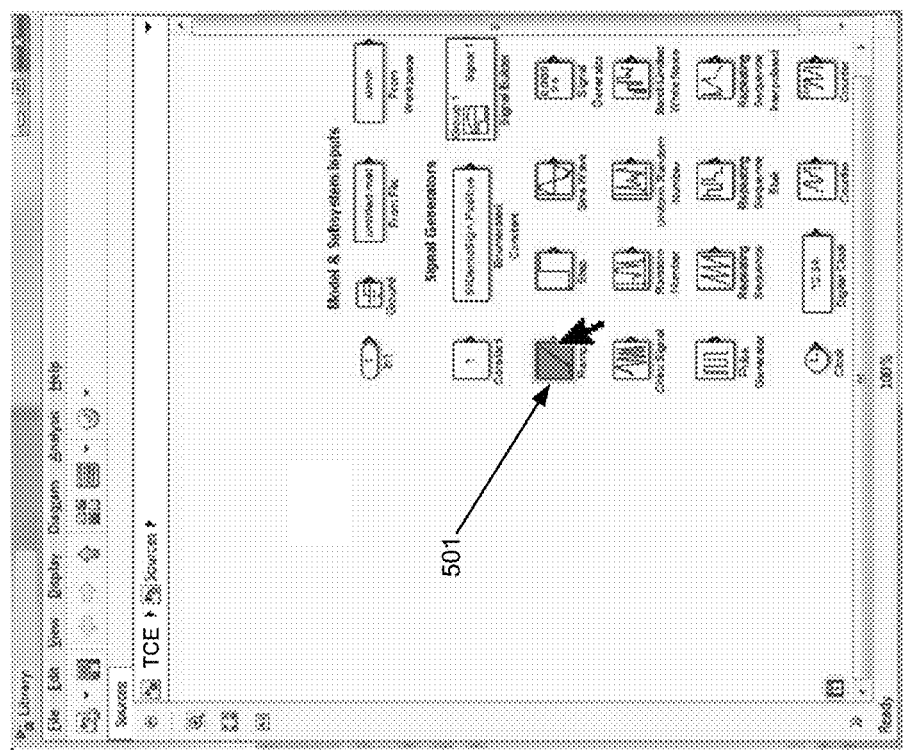
FIGS. 5A-5J are diagrams of an example implementation relating to the example process shown in FIG. 4.

FIG. 5A shows an example user interface that may be provided by client device 210. As shown, the user interface may provide a library of blocks that may be used in a block diagram model. The library may include base blocks (e.g., unmasked blocks), masked blocks, and/or derived blocks. As shown by reference number 501, a user may select a masked block (e.g., "Ramp"), and may interact with the user interface to add the masked block to a block diagram model and/or to edit the masked block.

Figure 5B:
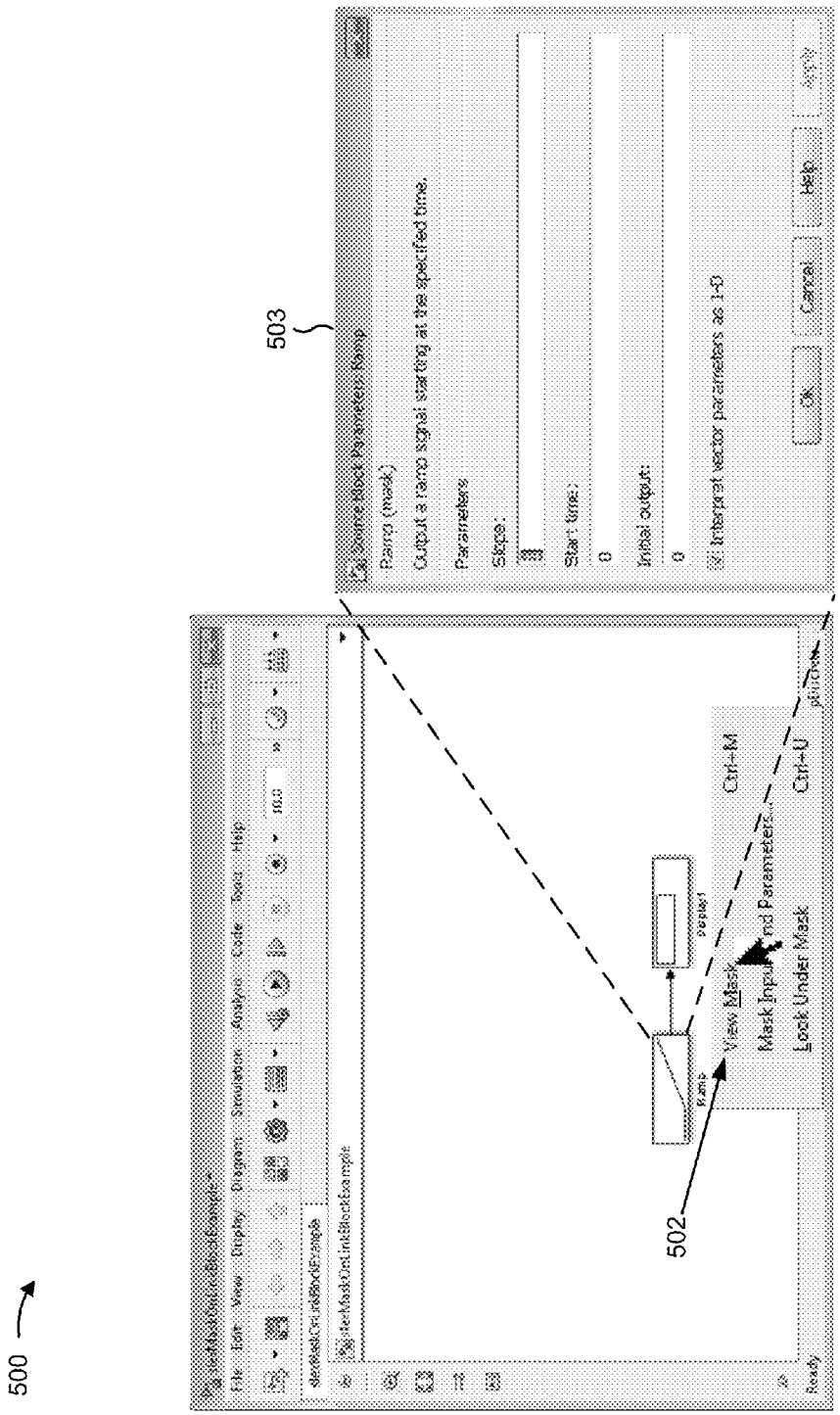

In FIG. 5B, assume that the user has selected a masked block called "Ramp," and has interacted with the user interface to add the masked block to a block diagram model. As shown by reference number 502, the user may further interact with the user interface to view a mask associated with the masked block. For example, the user may interact with an input mechanism (e.g., a menu item, a button, a keyboard shortcut, etc.), such as by selecting a representation of the masked block (e.g., a custom icon) and further selecting "View Mask."

As further shown in FIG. 5B, user selection of "View Mask" may cause client device 210 to provide user interface 503. User interface 503 may display information and/or parameters associated with the masked block. Additionally, or alternatively, user interface 503 may allow a user to specify a value for parameters associated with the masked block. As an example, and as shown in FIG. 5B, the user has specified a slope value of 1, a start time of 0, and an initial output of 0. Assume that user interface 503 represents a custom user interface for the masked block, and further assume that the user wishes to further customize the custom user interface.

Figure 5C:
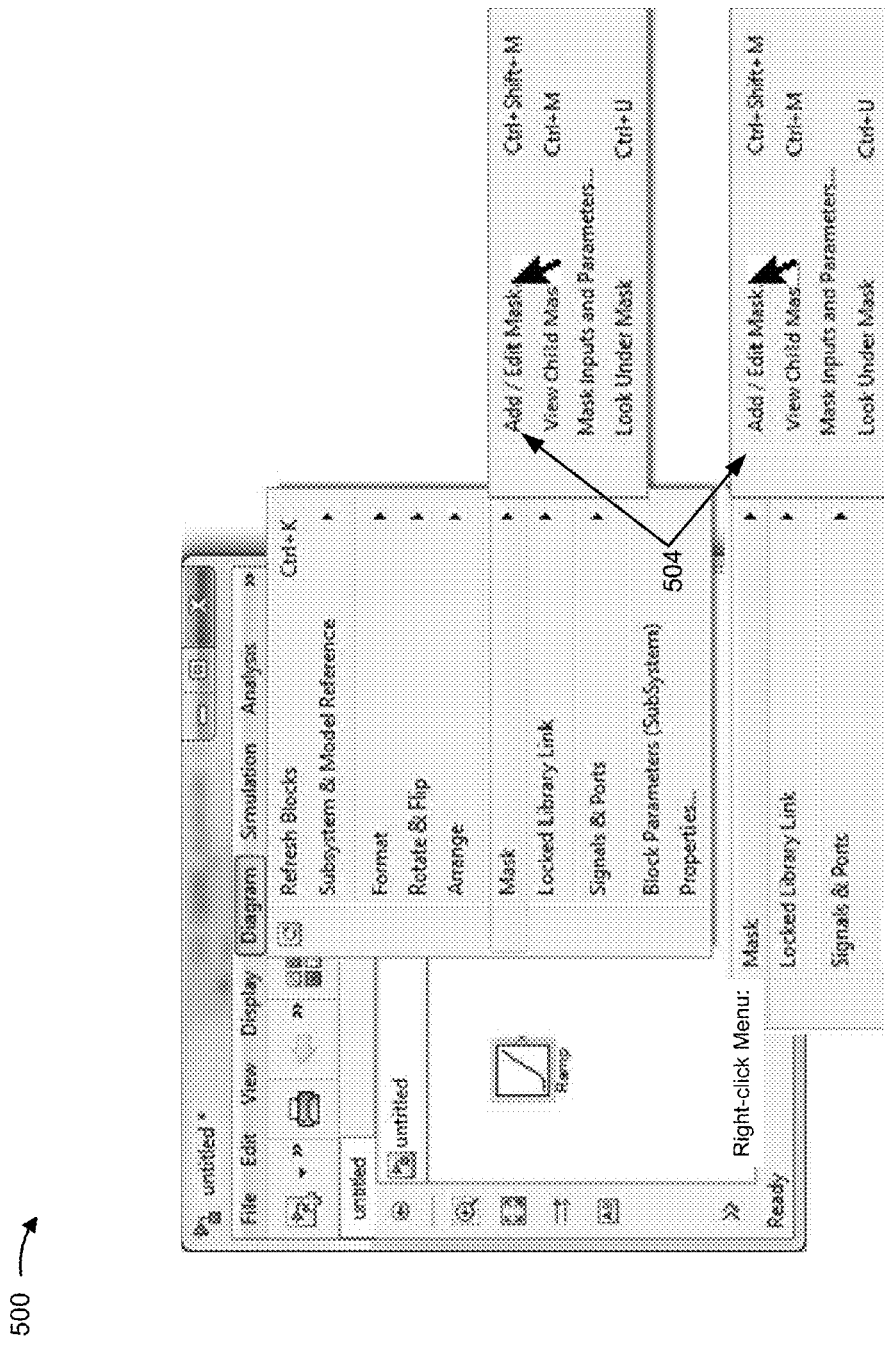

As shown in FIG. 5C, the user may further customize the custom user interface by interacting with an input mechanism (e.g., a menu item, a button, a keyboard shortcut, etc.), as shown by reference number 504. For example, the user may select a representation of the masked block (e.g., a custom icon) and may further select "Add/Edit Mask."

Figure 5D:
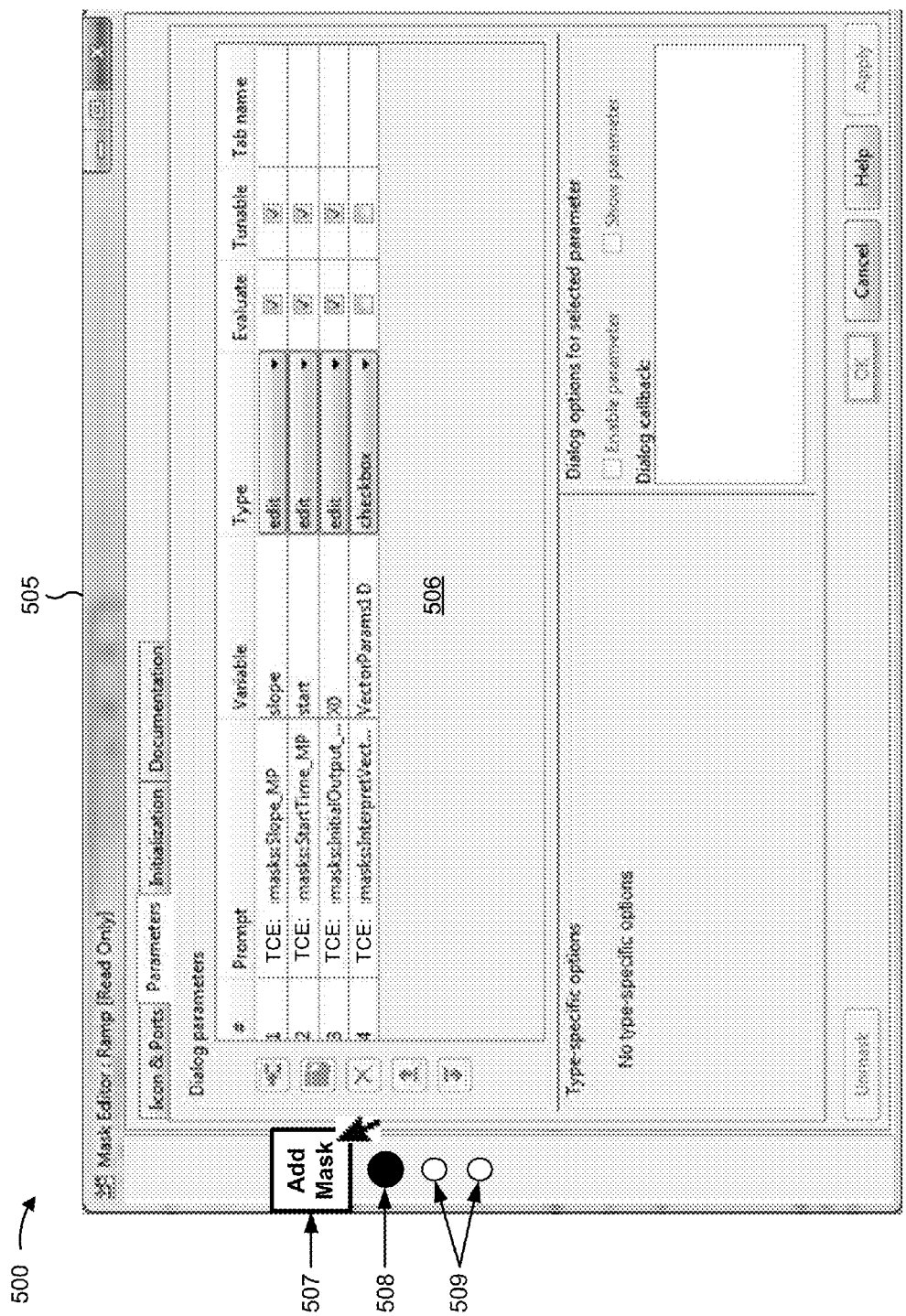

In FIG. 5D, assume that the user has selected the masked block called "Ramp," and has interacted with the user interface to indicate a desire to further customize a custom user interface associated with the masked block (e.g., via selection of "Add/Edit Mask"). Such interaction may cause client device 210 to provide user interface 505. User interface 505 may provide information associated with the masked block and/or information associated with a custom user interface associated with the masked block. For example, a parameter panel 506 may provide information that identifies masked block parameters associated with the masked block, and may provide a mechanism for a user to indicate whether the masked block parameters should be displayed and/or editable via the custom user interface.

As shown by reference number 507, user interface 505 may provide an input mechanism (e.g., a button, a menu item, etc.) that allows a user to create a custom mask for a masked block (e.g., to create a derived block, from the masked block, with a custom user interface). Additionally, or alternatively, user interface 505 may provide an input mechanism for a user to view different masks associated with the masked block (or a base block), as shown by reference numbers 508 and 509.

Reference number 508 and 509 show buttons that may cause user interface 505 to display information associated with a different mask associated with the masked block (or a base block of the masked block). In some implementations, user interface 505 may depict a selected mask (e.g., a mask with information currently being displayed via user interface 505) in a different manner than a mask that is not selected. For example, reference number 508 shows a black circle representing a mask that is currently selected (e.g., "Ramp"), and reference number 509 shows two white circles representing two masks that are not currently selected.

Additionally, or alternatively, user interface 505 may depict masks in a different manner based on a mask hierarchy. For example, reference number 508 shows a derived mask as a large circle, and reference number 509 shows two base masks as small circles. A derived mask may refer to a mask with parameters and/or properties that have been inherited from a base mask. In some implementations, client device 210 may only permit a user to edit derived masks, and may not permit a user to edit base masks. Additionally, or alternatively, if a mask is both a derived mask and a base mask, client device 210 may not permit the user to edit the mask.

Figure 5E:
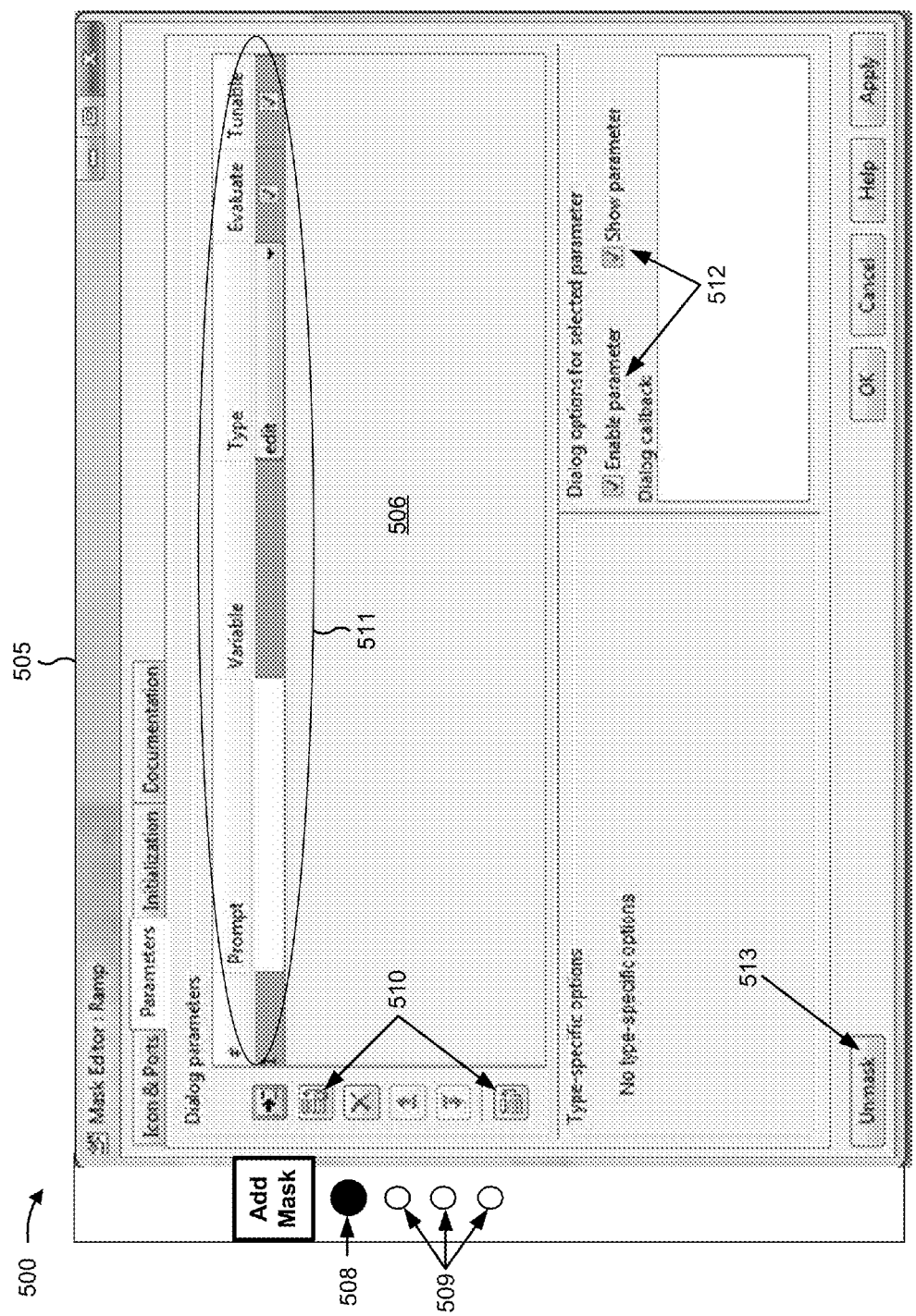

Assume that a user interacts with an input mechanism shown by reference number 507 ("Add Mask"). In response, client device 210 may change the information displayed on user interface 505, as shown in FIG. 5E. For example, parameter panel 506 may be changed to display parameters associated with a derived block (e.g., derived from the masked block) created by user selection of the "Add Mask" button. The user may modify the parameters associated with the derived block by selecting masked block parameters and/or by inputting additional parameters.

As shown by reference number 510, user interface 505 may provide an input mechanism for a user to select masked block parameters to inherit from the masked block and to include in the derived block (e.g., to be promoted from the masked block to the derived block). For example, the user may select to inherit all masked block parameters from the masked block, or may select one or more masked block parameters to inherit from the masked block. Additionally, or alternatively, the user may input additional parameters to include in the derived block, as shown by reference number 511.

As a user selects masked block parameters to inherit and/or inputs additional parameters, client device 210 may use rules (e.g., stored in memory) to determine whether the inherited parameters and the additional parameters may all be validly associated with the derived mask. If client device 210 determines that there is a conflict with the parameters, then client device 210 may alert the user (e.g., via the user interface) and/or may not permit the conflicting parameters to be associated with the derived mask (e.g., may only permit one of the conflicting parameters to be associated with the derived mask).

Once the user has specified a masked block parameter and/or an additional parameter to include in the derived block, the user may select a specified parameter, and may edit options for the selected parameter. For example, as shown by reference number 512, the user may indicate whether the selected parameter is to be provided on a custom user interface associated with the derived block ("Show parameter") and/or whether a user is to be permitted to specify a value of the added parameter via the custom user interface ("Enable parameter").

Additionally, or alternatively, when a user selects to add a mask, user interface 505 may change a manner in which a hierarchical representation of masks is represented, as shown by reference numbers 508 and 509. For example, reference number 508 may show a large black button that indicates a mask associated with the derived block is selected. As shown by reference number 509, an additional small white button may be added to user interface 505 to indicate that there are now three base masks, rather than two as shown in FIG. 5D.

Additionally, or alternatively, user interface 505 may provide an input mechanism for a user to remove an association between a mask and a block, as shown by reference number 513. For example, user selection of an "Unmask" button may delete a mask being edited via user interface 505 (e.g., a mask associated with the derived block).

Figure 5F:
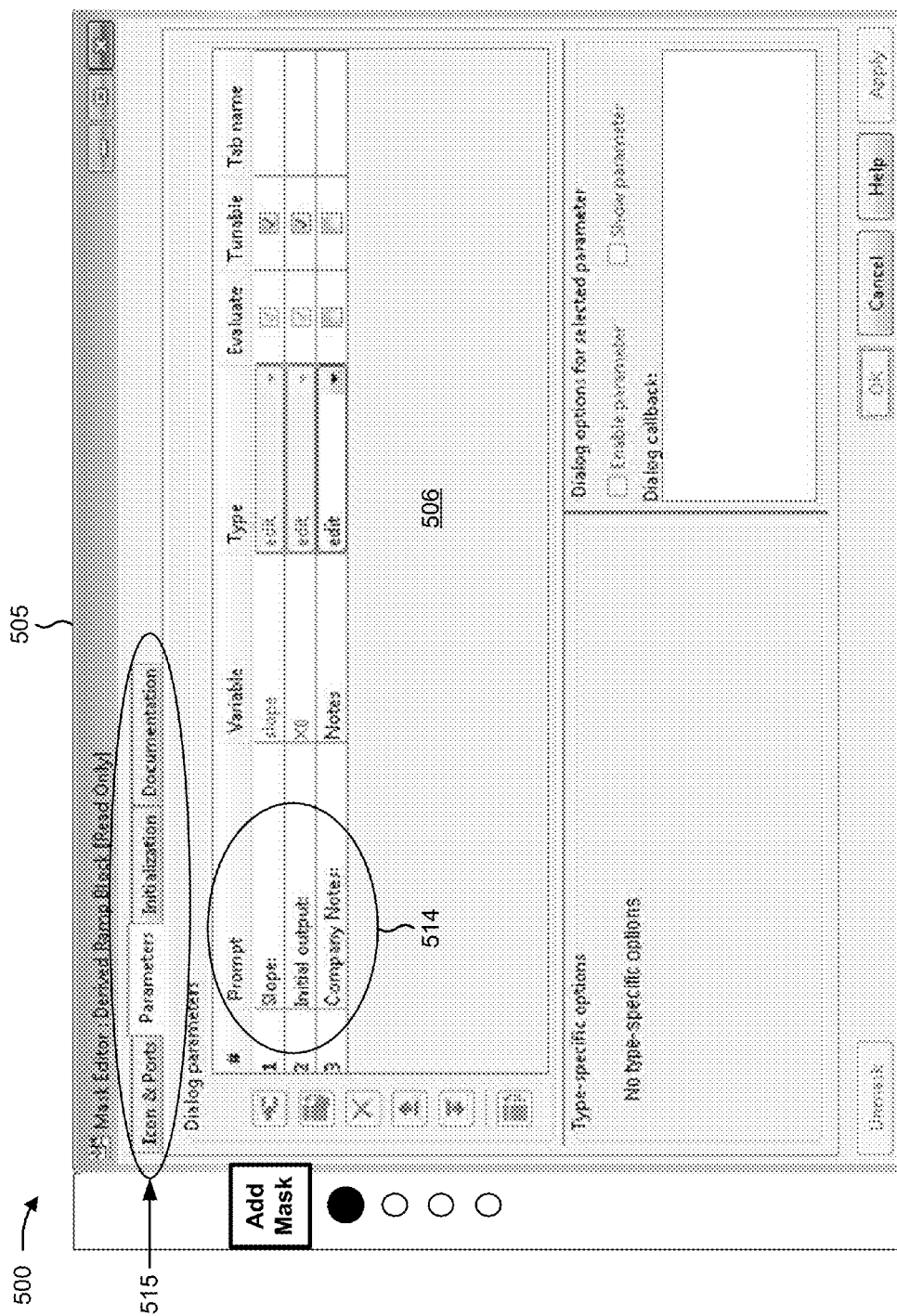

In FIG. 5F, assume that the user has selected the masked block parameters of "slope" and "initial output" to be inherited from the masked block and included as derived block parameters of the derived block. Further, assume that the user has input an additional parameter of "company notes" as a derived block parameter. In response to the user input of these masked block parameters and additional parameters, parameter panel 506 may provide the masked block parameters (slope and additional input) and additional parameters (company notes) for display, as shown by reference number 514.

In some implementations, the user may edit other properties of the derived block. As shown in FIG. 5F, the user may navigate between different interface panels, using tabs 515, to edit other properties of the derived block. For example, the user may select an "Icon & Ports" tab to display an interface panel that allows the user to specify an icon and/or input/output ports to be associated with the derived block.

Figure 5G:
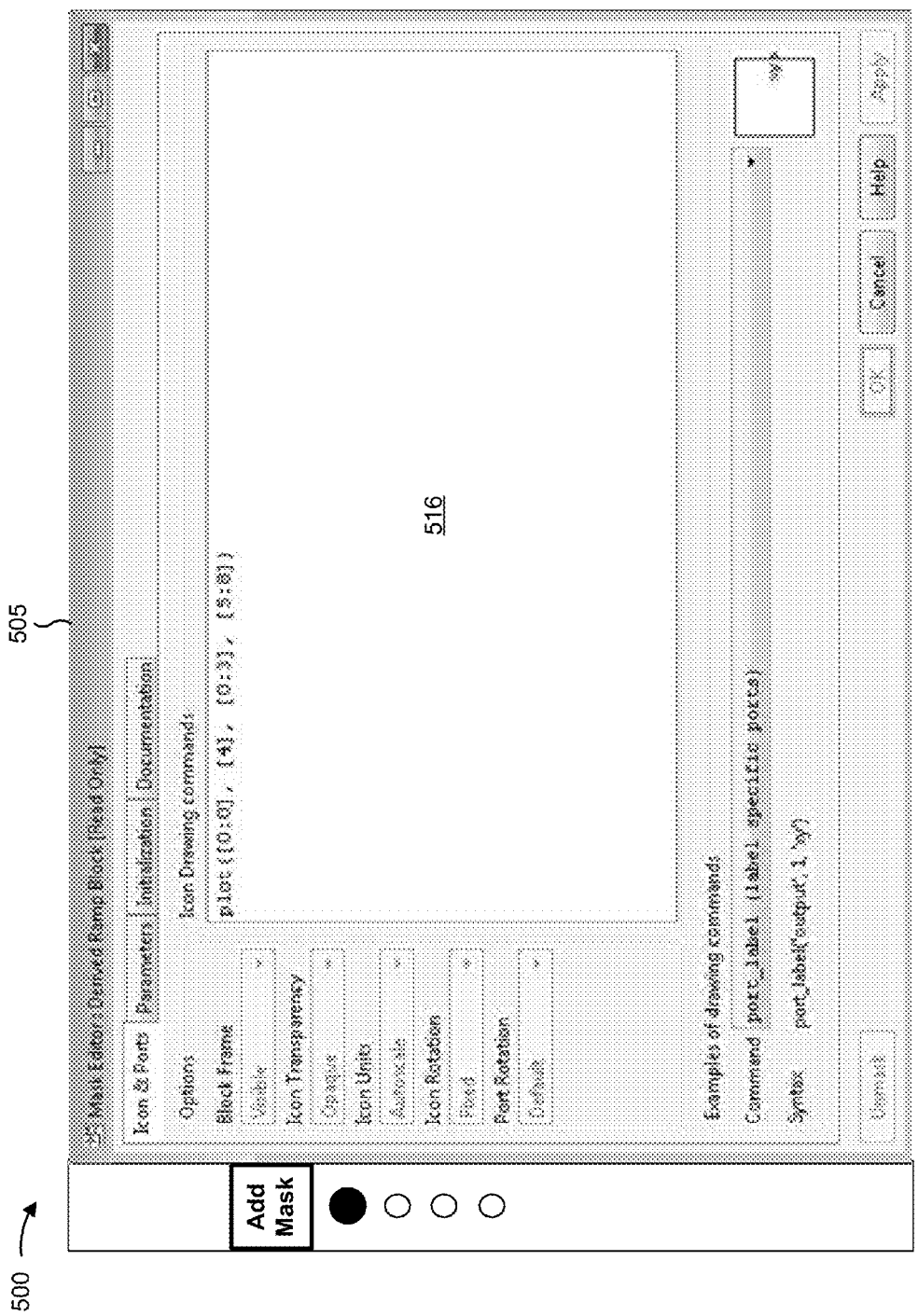

In FIG. 5G, assume that the user has navigated to the "Icon & Ports" tab. In response, user interface 505 may provide an icon and ports panel 516, as shown. The user may interact with icon and ports panel 516 to edit properties associated with the derived block, such as an icon to be used to represent the derived block in a block diagram model, a size of the icon, an input port to be included in the derived block, an output port to be included in the derived block, etc.

Figure 5H:

In FIG. 5H, assume that the user has navigated to a "Documentation" tab. In response, user interface 505 may provide a documentation panel 517, as shown. The user may interact with documentation panel 517 to edit properties associated with the derived block, such as a name of the derived block, a mask type of the derived block, a description of the derived block, etc.

When a user has finished editing parameters and/or other properties of the derived block, the user may interact with an input mechanism to indicate that the user has finished editing a mask associated with the derived block, as shown by reference number 518. In response, client device 210 may create the derived block with the parameters and properties specified by the user, and/or may create a custom user interface, for the derived block, that allows a user to specify values of derived block parameters.

Figure 5I:
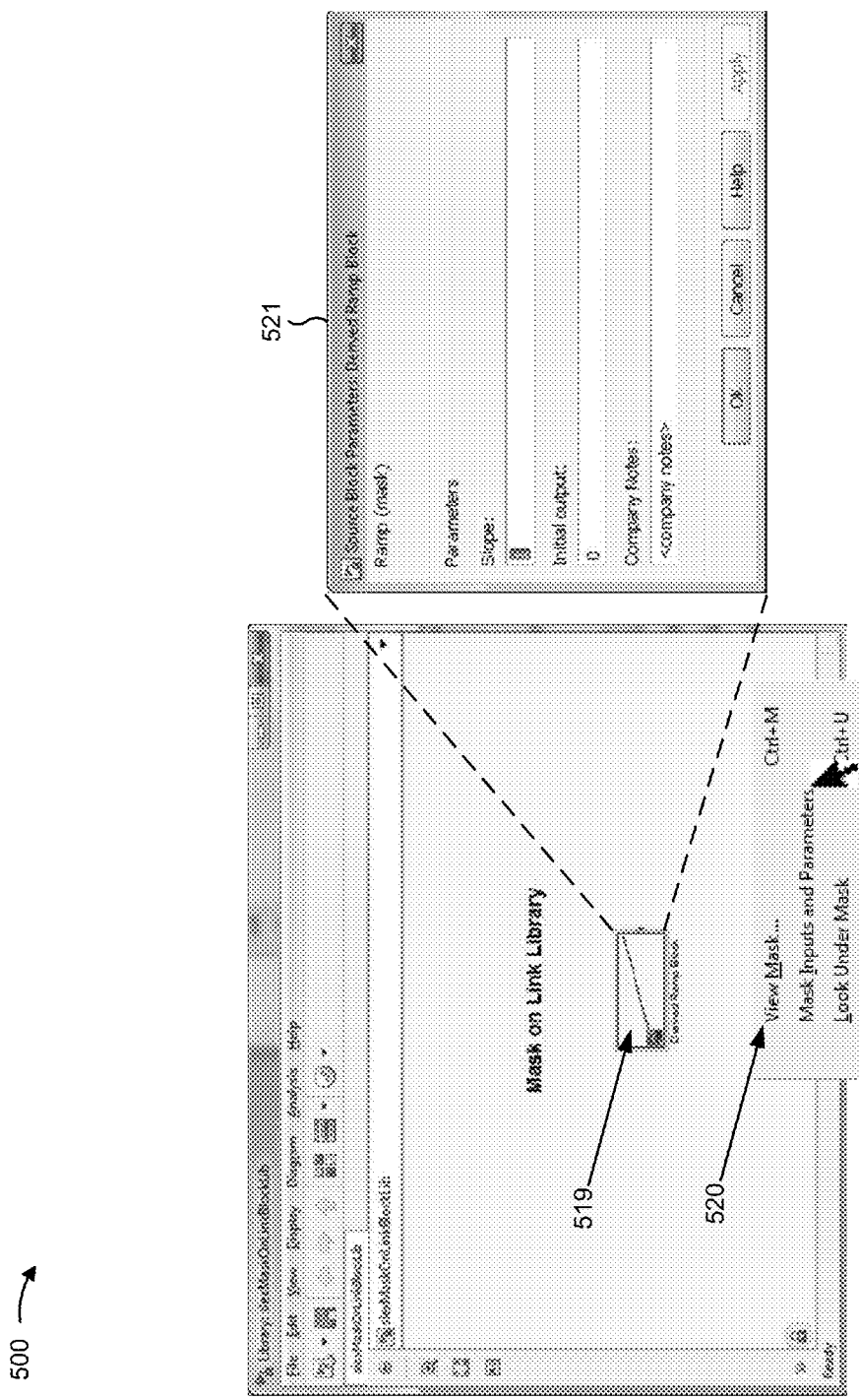

In FIG. 5I, assume that the user has specified parameters and properties of a derived block, as shown in FIGS. 5F-5H. Based on the information input via user interface 505 (FIGS. 5F-5H), client device 210 may provide a representation (e.g., an icon) of the derived block on a user interface, as shown by reference number 519 ("Derived Ramp Block"). As shown by reference number 520, the user may further interact with the user interface to view a mask associated with the derived block. For example, the user may interact with an input mechanism, such as by selecting the representation of the derived block, and further selecting "View Mask."

As further shown in FIG. 5I, user selection of "Mask Inputs and Parameters" may cause client device 210 to provide user interface 521. User interface 521 may display information and/or parameters associated with the derived block. Additionally, or alternatively, user interface 521 may allow the user to specify a value for derived block parameters associated with the derived block, such as a slope value of 1, an initial output of 0, and company notes of "<company notes>", as shown.

Figure 5J:
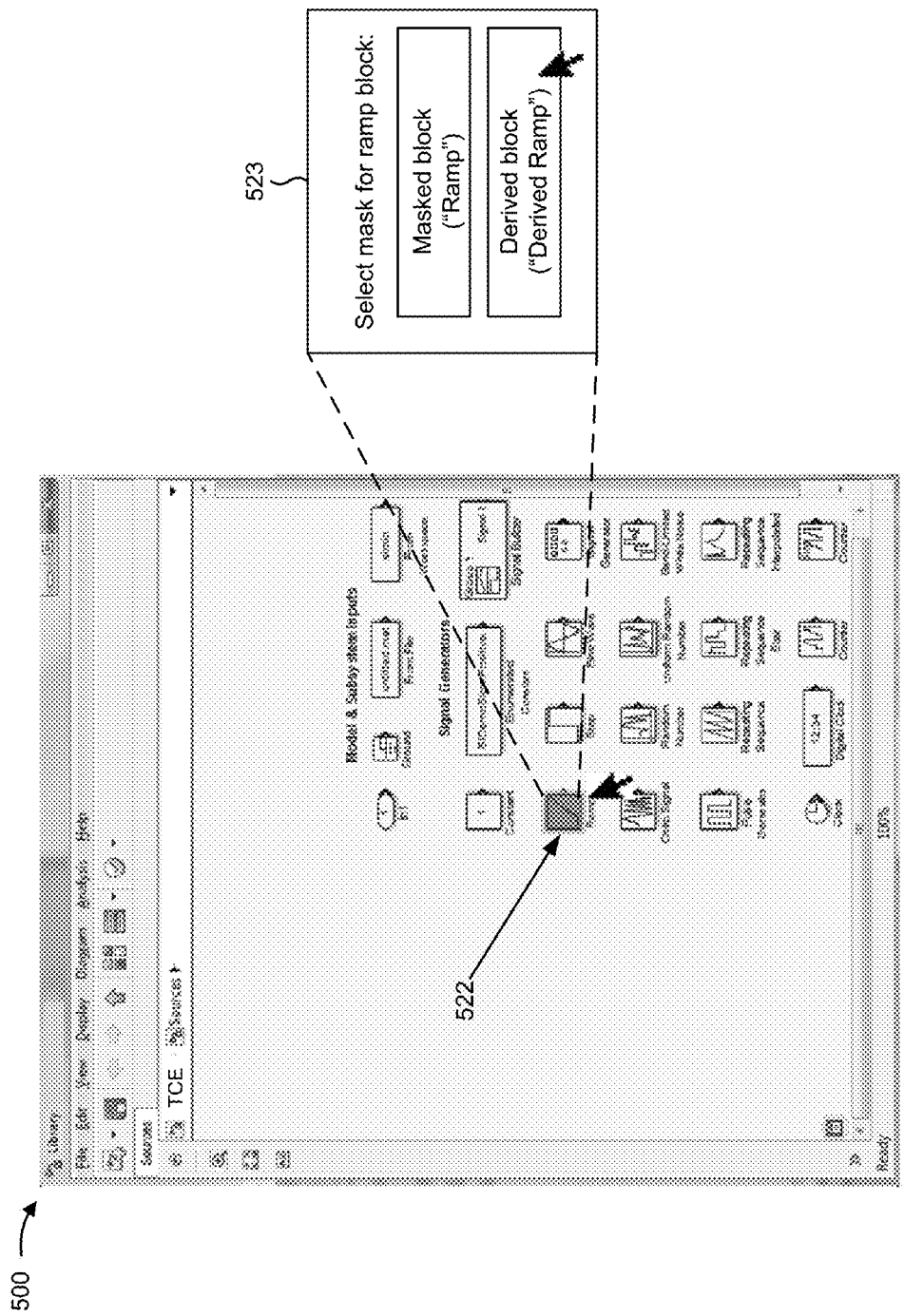

Client device 210 may store information associated with the derived block and the associated mask (e.g., user interface 521) in memory. As shown in FIG. 5J, client device 210 may store the derived block and the mask in a block library. Client device 210 may associate the derived block with the masked block from which the derived block was derived (e.g., from which the derived block inherited masked block parameters) and/or the base block from which the masked block was derived. In this way, the block library may be simplified by providing a hierarchical representation of blocks stored in the library.

As shown by reference number 522, a user may select a block, from the block library, that the user wishes to add to a block diagram model. The selected block may be associated with multiple masks (e.g., a mask and a derived mask). User selection of a block associated with multiple masks may cause client device 210 to provide user interface 523. The user may interact with user interface 523 to select a mask, associated with the selected block, to be used to specify parameters for the selected block when the selected block is added to a block diagram model.

The foregoing disclosure provides illustration and description, but is not intended to be exhaustive or to limit the implementations to the precise form disclosed. Modifications and variations are possible in light of the above disclosure, or may be acquired from practice of the implementations.

Certain implementations have been described herein with respect to creating a block hierarchy (e.g., by creating derived blocks from masked blocks). The systems and/or methods described herein may be applied to other hierarchical objects (other than blocks), such as text-based objects, java bean objects, state objects, workspace objects, or other objects.

Certain user interfaces have been described herein. In some implementations, the user interfaces may be customizable by a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed. A user may interact with the user interfaces described herein to create a custom user interface for a derived block. Additionally, or alternatively, a user may use program code to create the custom user interface for the derived block. Program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of the program code.

As used herein, a component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
  receive, via a first user interface, information that identifies a parameter associated with a masked block,
    the masked block being associated with a second user interface that identifies the parameter and that allows a value of the parameter to be specified for the masked block, and
    the masked block representing one or more elements of a block diagram model,
      the block diagram model, when executed, simulating a behavior of a system;
  receive, via the first user interface, user input identifying an additional parameter;
  receive, via the first user interface, an indication that the parameter and the additional parameter are to be associated with a derived block,
    the derived block inheriting one or more properties from the masked block, and
    the derived block representing the one or more elements of the block diagram model;
  determine whether associating the parameter and the additional parameter with the derived block creates a conflict;
  create, based on the indication, the derived block when associating the parameter and the additional parameter with the derived block does not create a conflict,
    when creating the derived block, the one or more processors are to create a third user interface based on the second user interface and the additional parameter,
    the derived block being associated with the parameter, the additional parameter, and the third user interface,
    the third user interface allowing a value of the parameter and a value for the additional parameter to be specified for the derived block, the first user interface, the second user interface, and the third user interface being associated with the block diagram model;
provide, via the first user interface, an input mechanism that permits navigation through multiple user interfaces included in a mask hierarchy,
the mask hierarchy including the second user interface and the third user interface;
receive an interaction with the input mechanism; and
provide the second user interface or the third user interface for display based on receiving the interaction with the input mechanism.

2. The device of claim 1, where the second user interface does not allow a value of the additional parameter to be specified for the masked block, and
where the one or more processors are to output or store information that identifies the additional parameter, the derived block, and an association between the additional parameter and the derived block.

3. The device of claim 1, where the parameter identifies at least one of:
an input to the masked block and the derived block;
an output from the masked block and the derived block;
a manner in which the input is processed by the masked block and the derived block; or
a manner in which the output is generated by the masked block and the derived block.

4. The device of claim 1, where the one or more properties include at least one of:
initialization code used to specify an initial value of the parameter;
a function associated with the masked block and the derived block; or
a portion of an icon that represents the masked block and the derived block.

5. The device of claim 1, where the one or more processors, when receiving the indication that the parameter and the additional parameter are to be associated with the derived block, are to:
provide, via the first user interface, a plurality of parameters associated with the masked block,
the plurality of parameters including the parameter;
receive a selection of one or more parameters of the plurality of parameters,
the one or more parameters including the parameter; and
receive the indication based on the selection.

6. The device of claim 1, where the one or more processors are to:
store the derived block in a block diagram library; and
where the one or more processors are further to:
receive a user selection of the derived block from the block diagram library; and
add the derived block to another block diagram model, based on receiving the user selection.

7. The device of claim 1, where the one or more processors are to:
add the derived block to the block diagram model;
receive a value for the parameter via the third user interface; and
execute the block diagram model, having the derived block, to simulate the behavior of the system based on the value for the parameter.

8. A non-transitory computer-readable medium storing instructions, the instructions comprising:
one or more instructions that, when executed by a processor, cause the processor to:
receive, via a first user interface, information that identifies a parameter associated with a first block,
the first block being associated with a second user interface that identifies the parameter and allows a value of the parameter to be specified for the first block,
the first block representing one or more elements of a block diagram model;
receive user input, via the first user interface, of information identifying an additional parameter;
receive, via the first user interface, an indication that the parameter and the additional parameter are to be associated with a second block,
the second block inheriting one or more properties from the first block,
the second block representing the one or more elements of the block diagram model;
determine whether associating the parameter and the additional parameter with the second block creates a conflict;
prevent at least one of the parameter or the additional parameter from being associated with the second block when associating the parameter and the additional parameter with the second block creates a conflict;
create, based on the indication, the second block when associating the parameter and the additional parameter with the second block does not create a conflict,
the one or more instructions to create the second block including one or more instructions to create a third user interface based on: information selected from the second user interface and the information identifying the additional parameter,
the second block being associated with the parameter, the additional parameter, and the third user interface,
the third user interface allowing a value of the parameter and a value for the additional parameter to be specified for the second block;
provide, via the first user interface, an input mechanism for navigating through information associated with a plurality of blocks included in a block hierarchy,
the block hierarchy including the first block and the second block;
detect an interaction with the input mechanism; and
provide information associated with the first block or the second block based on detecting the interaction with the input mechanism.

9. The non-transitory computer-readable medium of claim 8, where the second user interface does not allow a value of the additional parameter to be specified for the first block,
where the first user interface, the second user interface, and the third user interface are associated with the block diagram model, and
where the instructions further comprise one or more instructions that, when executed by the processor, cause the processor to output or store information that identifies the additional parameter, the second block, and an association between the additional parameter and the second block.

10. The non-transitory computer-readable medium of claim 8, where the parameter identifies at least one of:
an input to the first block and the second block;
an output from the first block and the second block;
a manner in which the input is processed by the first block and the second block; or a manner in which the output is generated by the first block and the second block.

11. The non-transitory computer-readable medium of claim 8, where the one or more properties include at least one of:
   initialization code used to specify an initial value of the parameter;
   a function associated with the first block and the second block; or
   a portion of an icon that represents the first block and the second block.

12. The non-transitory computer-readable medium of claim 8, where the one or more instructions that cause the processor to receive the indication include one or more instructions that, when executed by the processor, cause the processor to:
   provide a plurality of parameters associated with the first block,
      the plurality of parameters including the parameter;
   receive a selection of one or more parameters of the plurality of parameters,
      the one or more parameters including the parameter; and
   receive the indication based on the selection.

13. The non-transitory computer-readable medium of claim 8, where the instructions further include one or more instructions that, when executed by the processor, cause the processor to:
   output or store a hierarchical association among a plurality of blocks,
      the plurality of blocks including the first block and the second block,
      where the hierarchical association identifies the first block as a base block of the second block, and further identifies the second block as being derived from the first block; and
   selectively permit editing of a block, of the plurality of blocks, based on the block being identified as a base block or a derived block.

14. The non-transitory computer-readable medium of claim 8, where the instructions further include one or more instructions that, when executed by the processor, cause the processor to:
   add the second block to the block diagram model,
      the block diagram model, when executed, simulating a behavior of a system;
   receive a value for the parameter and a value for the additional parameter via the third user interface; and
   execute the block diagram model, having the second block, to simulate the behavior of the system based on the value for the parameter and the value for the additional parameter.

15. A method, comprising:
   receiving, via a first user interface, information that identifies a first plurality of parameters associated with a masked block that represents one or more elements of a block diagram model,
      the masked block being associated with a second user interface that identifies the first plurality of parameters and that allows values of the first plurality of parameters to be specified for the masked block,
      the receiving the information being performed by a device;
   receiving, via the first user interface, an indication that a parameter, of the first plurality of parameters identified by the second user interface, is to be associated with a derived block that represents at least one of the one or more elements of the block diagram model,
      the derived block inheriting one or more properties from the masked block,
      the receiving the indication being performed by the device;
   receiving, via the first user interface, user input that identifies an additional parameter to be associated with the derived block,
      the receiving the user input being performed by the device;
   determining whether associating the additional parameter with the derived block creates a conflict,
      the determining being performed by the device;
   creating, via the first user interface, the derived block based on the indication and the user input when associating the additional parameter with the derived block does not create a conflict,
      creating the derived block including creating a third user interface based on information selected from the second user interface and the additional parameter,
         the information selected from the second interface including information identifying the parameter,
      the derived block being associated with a second plurality of parameters and the third user interface,
      the first user interface, the second user interface, and the third user interface being associated with the block diagram model,
      the third user interface allowing values of the second plurality of parameters to be specified for the derived block,
      the second plurality of parameters including the parameter and the additional parameter,
      the second plurality of parameters being different from the first plurality of parameters, and
      the creating the derived block being performed by the device;
   providing, via the first user interface, an input mechanism for navigating through information associated with a plurality of user interfaces included in a mask hierarchy,
      the mask hierarchy including the second user interface and the third user interface,
      information identifying the second user interface being provided in a first manner,
      information identifying the third user interface being provided in a second manner that differs from the first manner based on the mask hierarchy,
      the providing the input mechanism being performed by the device;
   detecting an interaction with the input mechanism,
      the detecting the interaction being performed by the device; and
   providing information associated with the second user interface or the third user interface based on detecting the interaction with the input mechanism,
      the providing the information being performed by the device.

16. The method of claim 15, where the second user interface does not allow a value of the additional parameter to be specified for the masked block,
   the method further comprising:
      associating the additional parameter with the derived block,
         where the third user interface allows a value of the parameter and a value of the additional parameter to be specified for the derived block; and outputting or storing information that identifies the additional parameter, the derived block, and an association between the additional parameter and the derived block.

17. The method of claim 15, where the parameter identifies at least one of:
   an input to the masked block and the derived block;
   an output from the masked block and the derived block;
   a manner in which the input is processed by the masked block and the derived block; or
   a manner in which the output is generated by the masked block and the derived block.

18. The method of claim 15, where the one or more properties include at least one of:
   initialization code used to specify an initial value of the parameter;
   a function associated with the masked block and the derived block; or
   a portion of an icon that represents the masked block and the derived block.

19. The method of claim 15, further comprising:
   adding the derived block to the block diagram model, the block diagram model, when executed, simulating a behavior of a system;
   receiving a value for the parameter via the third user interface; and
   executing the block diagram model, having the derived block, to simulate the behavior of the system based on the value, for the parameter, received via the third user interface.

20. The method of claim 15, further comprising:
   identifying a block type associated with the masked block;
   receiving information identifying at least one of an input port or an output port to be included in the derived block;
   receiving information identifying a mask type of the derived block and a description of the derived block; and
   where creating the derived block further comprises:
      creating the derived block as a same block type as the block type associated with the masked block,
         the derived block including the at least one of the input port or the output port.

* * * * *